(12) United States Patent
Palumbo

(10) Patent No.: US 10,035,160 B2
(45) Date of Patent: Jul. 31, 2018

(54) DECORATION LINE FOR CERAMIC PRODUCTS AND PROCESS FOR DECORATING ON CERAMIC PRODUCTS

(71) Applicant: Projecta Engineering S.r.L., Fiorano Modenese (Modena) (IT)

(72) Inventor: Vincenzo Palumbo, Castellarano (IT)

(73) Assignee: PROJECTA ENGINEERING S.R.L., Fiorano Modenese (Modena) (IT)

( * ) Notice: Subject to any disclaimer, the term of this patent is extended or adjusted under 35 U.S.C. 154(b) by 0 days.

(21) Appl. No.: 14/436,816

(22) PCT Filed: May 31, 2013

(86) PCT No.: PCT/IB2013/054509
§ 371 (c)(1),
(2) Date: Apr. 17, 2015

(87) PCT Pub. No.: WO2014/060858
PCT Pub. Date: Apr. 24, 2014

(65) Prior Publication Data
US 2015/0290665 A1 Oct. 15, 2015

(30) Foreign Application Priority Data
Oct. 18, 2012 (IT) ............................ VR2012A0207

(51) Int. Cl.
*B05B 13/02* (2006.01)
*B28B 11/00* (2006.01)
(Continued)

(52) U.S. Cl.
CPC ............... *B05B 12/04* (2013.01); *B05B 1/30* (2013.01); *B05B 12/12* (2013.01);
(Continued)

(58) Field of Classification Search
None
See application file for complete search history.

(56) References Cited

U.S. PATENT DOCUMENTS 5,683,752 A * 11/1997 Popp ..................... B05B 12/126
                                                    118/668
6,120,604 A * 9/2000 Hawkins ................ B65G 43/10
                                                    118/300
(Continued)

FOREIGN PATENT DOCUMENTS

DE        3320160 A1    12/1894
EP        1038689 A1 *  9/2000   ........... B28B 11/001
(Continued)

*Primary Examiner* — Binu Thomas
(74) *Attorney, Agent, or Firm* — Tutunjian & Bitetto, P.C.

(57) ABSTRACT

A decoration line including a conveyor of the products on which to apply the enamel, at least a first enamelling machine of the spray type actuated by piezoelectric-driven nozzles suitable for applying, on the products transiting on the conveyor, at least one first substantially full layer of enamel of the vitreous type in suspension in liquid suspending agent suitable for being processed in a digital decorative system for creating base or a covering layer on the products and at least a second enamelling machine, positioned downstream of said first machine, of the spray type actuated by piezoelectric-driven nozzles suitable for applying, on the products transiting on the conveyor, at least a second substantially discontinuous layer of enamel of the vitreous or pigmented type in suspension in liquid suspending agent suitable for being processed in a digital decorative system for creating decoration or finishing effects on the products.

7 Claims, 2 Drawing Sheets

(51) Int. Cl.
  *B05C 11/00* (2006.01)
  *B05B 12/04* (2006.01)
  *B05C 11/10* (2006.01)
  *B28B 11/04* (2006.01)
  *B28B 17/00* (2006.01)
  *B05B 1/30* (2006.01)
  *B05B 12/12* (2006.01)
  *B44D 5/00* (2006.01)
  *C04B 41/81* (2006.01)

(52) U.S. Cl.
  CPC ...... *B05B 13/0221* (2013.01); *B05C 11/1005* (2013.01); *B28B 11/001* (2013.01); *B28B 11/044* (2013.01); *B28B 11/048* (2013.01); *B28B 17/0072* (2013.01); *B44D 5/00* (2013.01); *C04B 41/81* (2013.01)

(56) References Cited

U.S. PATENT DOCUMENTS

2003/0209560 A1* 11/2003 Hui ................. B05C 11/1005
                                             222/1
2005/0034658 A1*  2/2005 Palifka ............... B41J 2/17596
                                             118/313

FOREIGN PATENT DOCUMENTS

| EP | 1223151 A2 | 7/2002 | |
| EP | 2189272 A2 * | 5/2010 | ............ B28B 1/001 |
| WO | WO2010003933 A2 | 1/2010 | |

* cited by examiner

DECORATION LINE FOR CERAMIC PRODUCTS AND PROCESS FOR DECORATING ON CERAMIC PRODUCTS

TECHNICAL FIELD OF THE INVENTION

The present invention concerns a decoration line for ceramic products. More in particular, the present invention concerns a decoration line with completely digital control and management for products such as ceramic tiles and the like.

STATE OF THE ART

In the field of manufacturing ceramic tiles and the like, decoration lines are normally used that apply enamel onto the surface of the ceramic support, said enamel being suitable for creating a certain graphical and decorative effect as well as a functional result in terms of protection and covering of the support itself. In particular, the processes for applying enamel on ceramic supports can be substantially divided into two main categories.

In the first category there are the processes that carry out the enamel application with a full coat, i.e. essentially for creating base or covering layers.

In the second category there are, on the other hand, the processes that carry out the enamel application in a discontinuous manner, i.e. essentially for creating patterns or decorations.

The decoration processes belonging to the two aforementioned types can be applied irrespective of one another, in relation to the different production requirements.

However, more complete decoration lines usually foresee the application of processes belonging to both the categories, since ceramic tiles manufactured nowadays almost always require both a base layer and a subsequent application of enamel for decorative purposes.

Consequently, the application of said processes requires the decoration line to comprise respective separate apparatuses having different characteristics and operation modalities.

In terms of the types of machines available on the market, these can be substantially divided into analog machines and digital machines.

By analog machines, we mean those of the conventional type, which use devices the application and the relative adjustment of which, in terms of the enamel process, are essentially of the mechanical type: for example bells or aerographs for full coats, or silk screen or roll flexographic decorating machines.

Digital machines, on the other hand, are those which apply the enamel on the ceramic support through heads that dispense a jet that is actuated by piezoelectric-driven nozzles or other types, the actuation of which and the adjustment of which are driven for the digital decoration process.

Concerning the enamel, on the other hand, as it is known, enamels can be used that may or may not be of the vitreous type, the non-vitreous type usually being characterised by a suspension in liquid suspending agent that is suitable for being processed in a digital machine, usually not water based, and commonly defined as "inks".

Moreover, for their use respectively on analog or digital machines, enamels are mainly distinguished in relation to the type of enamelling medium used, or rather made up of granulated glass, usually in aqueous suspension, but also of other types, for example pigment based, usually in glycol suspending agent, but even of other types.

Analog type machines typically use enamel in aqueous suspension, whereas digital machines must necessarily use enamels that are made up of suspensions in special suspending agents that are suitably selected for this type of application, usually of the glycol type.

At the current state of the art, vitreous enamels are mostly produced in aqueous solution, and can therefore be used only in machines of the analog type. The enamels made up of suspensions in liquid suspending agent, usually glycol-based, but also other types, are currently used only to obtain pigment-based decoration mediums, mainly made with oxides of various kinds, i.e. the aforementioned so-called inks that are intended for the digital decoration with machines equipped with heads having piezoelectric-driven nozzles or other types, in any case digitally managed during the decoration process.

Both types of machines, i.e. analog and digital, are each characterised by advantageous aspects and drawbacks relating to the respective types of enamels that they can use, and that shall be briefly outlined in the rest of the description.

As far as vitreous enamels in aqueous suspension are concerned, which can be used with analog-type machines, it can be observed that the aqueous suspension generates the necessity of a great excess of application, with abundant waste of enamel; moreover, the result of the application necessarily has low resolution graphics, which is not suitable for all requirements.

Again, the preparation process of the enamelling medium is decisively complex and messy, due to the fact that analog-type machines require the enamel to be already produced in its final application colour and not in the base colours, and this forces the producers to set up their stores with great amounts of material, which is difficult to manage also in terms of logistics.

On the other hand, vitreous enamels in aqueous suspension benefit from the advantages related to the possibility of applying great amounts of material and, thanks to the presence of vitreous raw material, generating large decoration effects on the final product in terms of depth and gloss.

Concerning now digital application of pigments and inks in the form of suspension in liquid suspending agent, suitable for being processed in a digital decorative system, it can firstly be observed that with it there is no need for the product to be excessively applied, consequently the waste is insignificant.

The graphic resolution that can be obtained in the application of product can also be very high.

Moreover, the process of preparing the mediums, although quite complex, is finalised only for producing the base colours, and consequently it does not require the storage of great amounts; the management and the logistics of the material, therefore, is considerably simplified.

On the other hand, applications based on this technology do not benefit from the advantages relating to the possibility of applying large amounts of material on the ceramic support. Consequently, the decoration effects of depth and gloss on the end product can be obtained only if combined with a previous application of vitreous enamel in aqueous suspension with an analog-type apparatus.

Based upon what has been described above, it should be clear that current decoration lines are made up of a mixed combination of apparatuses that are very different from one another, i.e. analog apparatuses that are capable of applying vitreous suspensions in water, and additional digital apparatuses that are capable of applying, mostly discontinuously, suspensions of non-vitreous pigments in suspending agents, with the sole function of carrying out the end decoration of the products.

SUMMARY OF THE INVENTION

The technical task of the present invention is therefore that of improving the state of the art.

In such a technical task, one purpose of the present invention is to devise a decoration line that makes it possible to eliminate the drawbacks mentioned above.

Another purpose of the present invention is that of making a decoration line that makes it possible to optimise the operation of the various machines of the line, whatever the type, both in terms of the results that can be obtained and in terms of the costs and materials used.

A further purpose of the present invention is that of devising a decoration line that makes it possible to obtain products that are qualitatively higher with respect to those which can be made with known types of decoration lines.

Yet a further purpose of the present invention is that of simplifying the management of the decoration line and in particular the management of the machines that make up the line itself.

This task and this purpose are achieved with the decoration line according to the attached claim 1, and with the enamelling process according to the present principles.

According to one aspect of the present invention, the decoration line comprises at least one machine for applying one layer of enamel on products to be decorated and at least one control and diagnostic station that is equipped with a viewing device, positioned downstream of the aforementioned machine, which is suitable for controlling the difference between the result obtained on the products and a pre-set graphical reference.

In particular, the control and diagnostic station with a viewing device foreseen in the decoration line according to the invention makes it possible to adjust and control, in real time, the operation of the enamelling machine so as to optimise the main parameters that characterise the decoration of the products—for example the thickness of the enamelling, the surface characteristics thereof—so as to obtain an end product having high quality.

Further advantageous characteristics are described herein.

BRIEF DESCRIPTION OF THE DRAWINGS

The characteristics of the invention shall become clearer to a man skilled in the art from the following description and from the attached drawing tables, given as a non limiting example, in which:

FIG. 1 is a general schematic lay-out of a production plant of ceramic tiles and the like;

DETAILED DESCRIPTION OF THE INVENTION

Figure 1:
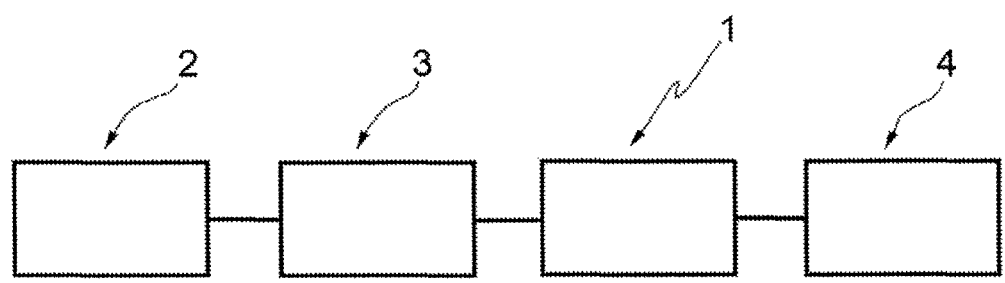

With reference to the chart of the attached FIG. 1, reference numeral 1 wholly indicates a decoration line according to the present invention.

The decoration line is particularly, but not exclusively intended for the application of enamel on products such as ceramic tiles and the like; however, the decoration line is for a completely general use and could be used also for other types of ceramic products, without any limitation.

More in detail, the decoration line according to the present invention is preferably intended for applying enamel on so-called green ceramic tiles, i.e. not yet undergone processes of kiln firing. However, the line could be used also for applying enamel on tiles that have already been fired in the kiln.

Let us use, as an example, the decoration line for products that have not yet undergone the kiln firing process.

We refer now to the general and schematic lay-out of FIG. 1.

The decoration line 1 is therefore, in this case, typically inserted in a complete production line of ceramic tiles, of the per se known type, and has the function, as shall be seen in the rest of the description, of creating the desired graphical effects for decorating tiles while also controlling, at the same time, the quality of the result obtained.

The production line comprises for example, in series with one another, a press 2 for the production of ceramic supports of the desired dimensions, a drying station 3 for the ceramic supports, the decoration line 1 according to the invention and finally a firing kiln 4, from which the finished tiles come out.

It should be underlined that such a tile production line is illustrated purely as an example for the sake of clarity: indeed, the production line could also comprise other stations of the known type, in relation to the specific production requirements, and that shall not be further described here since they are not object of the present invention.

The decoration line 1 according to the invention comprises a conveyor 5 of the products 6 on which to apply the enamel.

As mentioned, the products 6 are preferably made up of ceramic tiles, but they could also be ceramic products of another nature.

The conveyor 5 is for example of the belt type, but it could also be of another type known in the field, without any limitation to the purposes of the present invention.

As mentioned, the products 6 that travel on the conveyor 5 come from the drying station 3 of the production line, and are then intended to be introduced into the firing kiln 4 when the decorations have been carried out.

According to one aspect of the present invention, the decoration line comprises at least one first enamelling machine 7.

The first enamelling machine 7 is suitable for applying, on products 6 transiting on said conveyor 5, at least a first substantially full layer of enamel, for creating a base or a cover layer on the products 6 themselves.

In one embodiment of the present invention, the first enamelling machine 7 is of the spray type actuated by piezoelectric-driven nozzles.

The first enamelling machine 7 is, more in detail, suitable for applying, on products 6 transiting on the conveyor 5, at least one first layer of vitreous type enamel in suspension in liquid suspending agent that is suitable for being processed in a substantially full coating digital decoration system, for creating a base or a cover on the products 6.

In order to make the invention clearer, it is worth underlining that the first enamelling machine 7 is, for example, of the type described in Italian patent application n. RE2011A000012, to the same Applicant.

The first enamelling machine 7 could, however, also be of a different type.

It should be underlined that in other embodiments of the invention, the first enamelling machine 7 could be of the analog type, or of another type again without limitation to the purposes of the present invention.

For example, the piezoelectric-driven nozzles that apply the first layer of enamel are foreseen—in a per se known manner—on heads 8 that directly face onto the upper surface of the conveyor 5 and that, in use, are at a predetermined distance—for example a few millimeters—from the upper surface of the products 6.

Typically, each of the heads 8 installed on the first enamelling machine 7 corresponds to a single type of enamel that can be applied onto the surface of the products 6, or rather to a single colour of the enamel, etcetera.

The dispensing system of the enamel through the heads 8 of the first machine 7 is in any case suitable for applying flows of enamelling medium with a high flow rate and low resolution, i.e. indeed suitable for creating base or cover layers also with relatively large amounts of material.

This is substantially obtained by multiplying the number of heads 8 so as to obtain the desired amount of enamelling medium.

Figure 2:
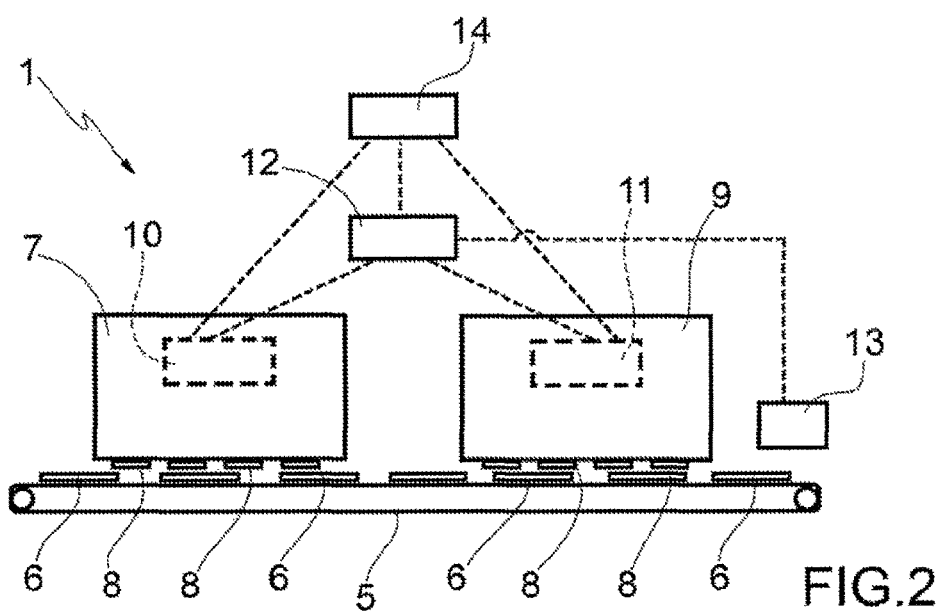
FIG. 2 is a schematic front view of the decoration line according to the present invention.

In FIG. 2 the first machine 7 comprises four heads 8, such a number should be considered as an example and not taken for limiting purposes.

Indeed, it is possible however, to use a first machine 7 equipped with a single head 8, in relation to specific application and/or cost requirements. In the case in which there is only one head 8, the required amount of enamelling medium is dispensed over a substantially longer time period.

As mentioned, the enamelling medium is of the vitreous enamel type in suspension in liquid suspending agent that is suitable for being processed in a digital decoration system.

According to another aspect of the present invention, the decoration line comprises at least one second enamelling machine 9, arranged downstream of the first machine 7 with respect to the conveyor 5, as illustrated in FIG. 2.

The enamelling machine 9 is suitable for applying on the products 6 transiting along the conveyor 5 at least one second substantially discontinuous layer of enamel, for creating decorative or finishing effects on the products 6 themselves.

In one embodiment of the present invention, also the second enamelling machine 9 is of the spray type actuated by piezoelectric-driven nozzles.

More in detail, the second enamelling machine 9 is suitable for applying, on the products 6 transiting on the conveyor 5, at least one second substantially discontinuous layer of enamel of the vitreous or pigmented type in suspension in liquid suspending agent suitable for being processed in a digital decorative system, for creating decorative or finishing effects on the products.

On each product, therefore, the second layer of enamel dispensed by the second machine 9 is therefore applied directly above the first layer dispensed by the first machine 7.

The second enamelling machine 9 is constructively completely similar to that of the first machine 7, and shall not, therefore, be described any further.

It should be underlined, however, that the dispensing system of the enamel through the heads 8 of the second machine 9 is suitable for applying flows of enamelling mediums with medium-low flow rate and with high resolution, i.e. indeed suitable for creating particular decorative and finishing effects on the base or cover that has already been deposited by the first enamelling machine 7.

For the second machine 9 the number of heads 8 relates to the colours to be dispensed, i.e. each head 8 can dispense a specific colour that is different from the other heads.

In other embodiments, the second machine 9 could be of another type, for example of the analog type.

In some embodiments of the invention, the decoration line could comprise at least one first machine 7 of the analog type, and at least one second machine 9 of the spray type actuated by piezoelectric-driven nozzles.

Or, in yet other embodiments of the invention, the decoration line could comprise a first machine 7 of the spray type actuated by piezoelectric-driven nozzles, and a second machine 9 of the analog type.

Of course, the selection of the type of machines that make up the line depends upon various factors such as the type of product 6 to be decorated, the type of decoration to be made on the product 6, the sequence of application of the various enamels, and yet more.

Of course, these factors also affect the order according to which the various machines are arranged in the decoration line.

The first enamelling machine 7 and the second enamelling machine 9 are equipped with respective local control stations 10, 11, which provide for managing the basic operation parameters of the machines 7, 9.

According to yet another aspect of the present invention, the decoration line comprises a control and diagnostic station 12.

Such a station 12 thus defines a first diagnostic level, or of control of products 6 of the operation of the decoration line 1.

In general, the control and diagnostic station 12 provides for checking the quality of the results obtained in the application of enamels and provides for correcting the application parameters in the case in which the result obtained is too different from the expected one.

More in detail, the control and diagnostic station 12 comprises a viewing device 13 that is suitable for checking the difference of the result obtained on the products 6 in applying the layers of enamel from the pre-set graphical reference.

The viewing device 13 is installed downstream of the second enamelling machine 9.

More in particular, the viewing device 13 is made up of a video camera.

For example, the video camera can be of the linear type or of the matrix type.

Moreover, the control and diagnostic station 12 comprises capacitive sensor means for detecting the thickness of the products 6 at the end of the enamelling.

The control and diagnostics station comprises, moreover, sensor means that are suitable for detecting characteristics of each product 6 such as the opacity, refraction of the incident light, and other similar characteristics that are important for evaluating the quality of the result obtained.

The control and diagnostics station 12 moreover comprises a control device with a microprocessor communicating online and in feedback with the local control stations 10, 11, for example so as to eliminate the production defects by carrying out cleaning cycles of the nozzles of the heads 8, or for modifying the printing parameters so as to recalibrate the colour shifting, or for again carrying out other adjustments that are suitable for optimising the operation of the machines 7, 9.

According to a further aspect of the invention, the decoration line 1 comprises a microprocessor-controlled supervisor 14 for managing the operation of the line, to which the first enamelling machine 7 and the second enamelling machine 9 are operatively connected.

More in detail, the supervisor 14 is suitable for communicating online and in feedback with the local control station 10, 11 of the machines 7, 9.

The supervisor 14 thus defines a second—and upper—level of supervision of checking of the operation of the decoration line 1.

The supervisor 14 comprises means for generating an automatic set-up for each machine 7, 9—mainly in terms of application parameters of the enamel—in relation to the reference designs and to the format to be enameled, so as to carry out a rapid and automatic change of production.

The supervisor 14, moreover, before continuing with the implementation of the new set-up intended for the new production lot, provides for sending, to the local control stations 10, 11, information relative to the new set-up so as to allow the production, without interrupting the current one, of some test applications—also called "test di staffetta"—of the first layer and/or of the second layer on the products 6, based upon the aforementioned new set-up before carrying out the change of production.

The decoration process carried out with the line according to the invention is thus completely intuitive.

The process described in the rest of the description assumes that both the machines 7, 9 are of the spray type actuated by piezoelectric-driven nozzles.

The products 6, coming from the drying station 3 advance along the conveyor 5.

The first machine 7 then proceeds to apply on each of the products 6 at least one first layer of enamel of the vitreous type in suspension in liquid suspending agent that is suitable for being processed in a substantially full layer of a digital decorating system, for creating a base or a cover layer on the products.

Each of the products 6 then advances towards the second machine 9.

The latter provides for applying on each of the products 6—and therefore on the first layer of enamel—at least one second layer of enamel of the vitreous or pigmented type in suspension in liquid suspending agent that is suitable for being processed in a digital decorating system that is substantially discontinuous, for creating decorative or finishing effects on the products.

The products 6 are then analysed by the control and diagnostics station 12, which can operate for example on two threshold levels, a first of which is a simple surveillance level, and a second of which is a feedback variation level of the application parameters of the enamels if the difference between the result obtained on the products 6 and a pre-set graphical reference is considered intolerable, and therefore, in other words, to recalibrate the colour shifting, the thicknesses, or yet other parameters.

It can also be foreseen for there to be a discharge step, through special expulsion means, of the products 6 that are considered unsuitable.

If at least one of the machines of the line 7, 9, is of the analog type, the application step of the respective layer of enamel—in a complete or discontinuous layer, according to the decoration step—occurs according to the typical operation modalities of these types of machines, for example by using known tools such as rollers, bells, aerographs or yet others. The control of the operation of the machine or of the machines of the analog type occurs in any case under the supervision of the respective local control station 10, 11 and, in turn, of the supervisor 14.

This centralised control of the operation of the line makes it possible to optimise the result obtained, especially thanks to the presence of the control and diagnostics station 12; the latter makes it possible to adjust in feedback, with extreme precision, the operation parameters of the machines 7, 9 so as to ensure high quality performance, together with a minimised consumption of material.

If the decoration line is of the mixed type, or rather if it comprises one of the machines 7, 9 of the analog type and the other of the spray type actuated by piezoelectric-driven nozzles, the supervisor 14, by means of the local control stations 10, 11, ensures an optimal integration of the operation of the two machines in their respective main operation parameters and in the respective production steps for making a certain decoration pattern on a certain type of product 6.

In other simplified embodiments of the decoration line according to the invention, there could be only one enamelling machine 7, 9, together with the control and diagnostics station 12 with the viewing device 13 positioned downstream thereof.

Figure 3:
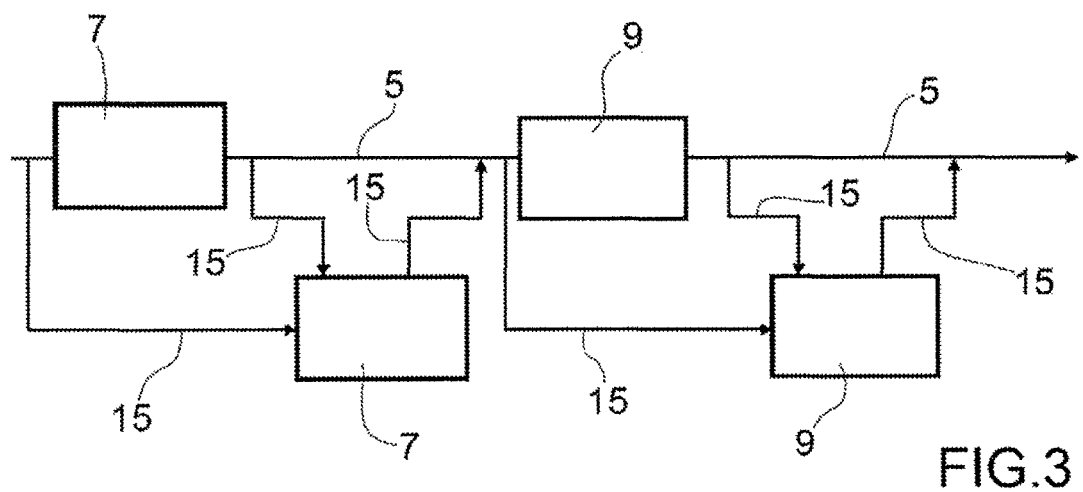
FIG. 3 is a lay-out in plan view of the decoration line.
Figure 4:
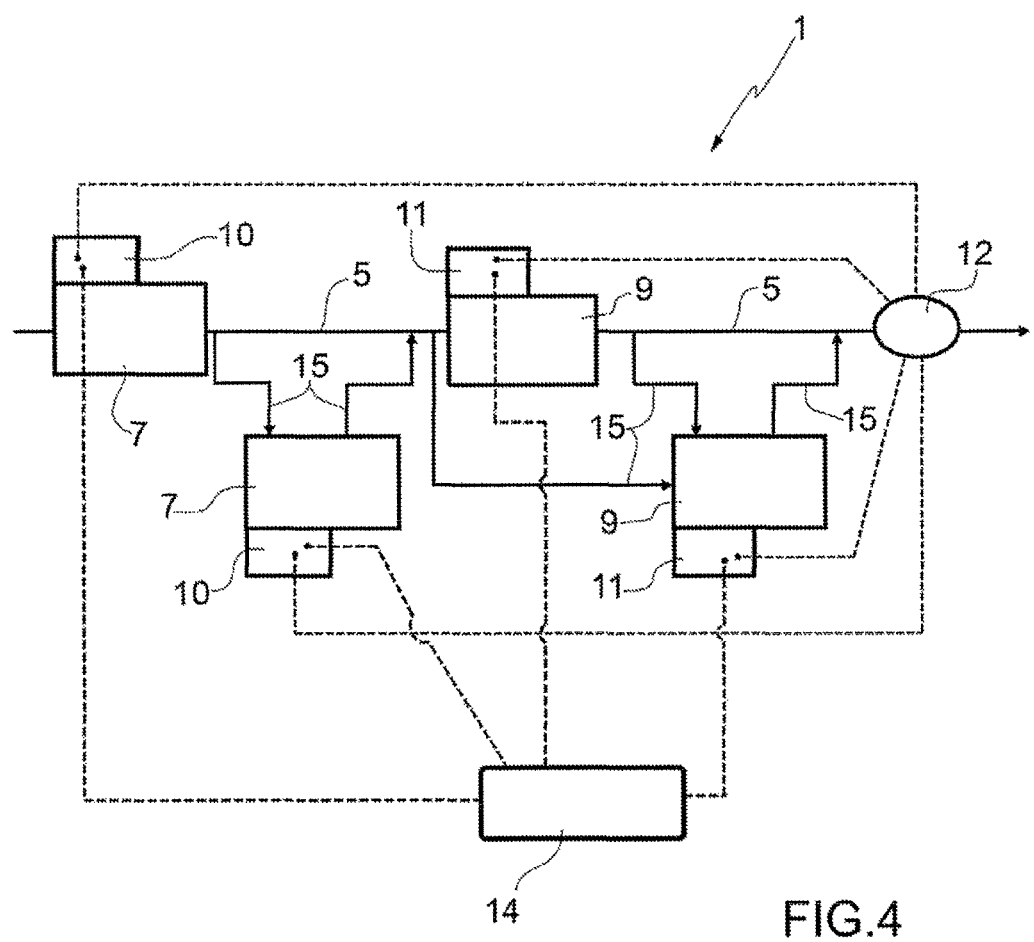
FIG. 4 is a flow chart of the decoration line.

Another embodiment of the decoration line according to the present invention is illustrated in FIGS. 3, 4.

This embodiment is different from the previous one due to the fact that the decoration line comprises a plurality of first machines 7 that are arranged in series with one another and/or in parallel with one another, and a plurality of second machines 9 that are arranged in series with one another and/or in parallel with one another, as illustrated in the detail of FIG. 3.

The first machines 7 and the second machines 9 are connected by special branches 15 of the conveyor.

In other words, the line 1 can operate so as to use only one first machine 7 and only one second machine 9, or, alternatively, it can use many first machines 7 or many second machines 9 in series or in parallel.

In such a way the line can operate with maximum versatility: the first machine 7 and the second machine can thus operate alternately with one another, or together—i.e. in series—with one another, for example so as to obtain results that cannot be achieved with single machines.

FIG. 4 also illustrates in detail also the diagnostic level and the level of supervision of the control of the operation of the decoration line, that are similar to those described for the previous embodiment.

Of course the number of first machines 7 and second machines 9 used in the line according to the invention can be any.

It has thus been seen how the invention achieves the proposed purposes.

In the case in which all the machines of the line are of the type with piezoelectric-driven nozzles, the use of enamels constituted by suspensions in liquid suspending agent suitable for being processed in a digital decorating system makes it possible to drastically reduce the costs and the storing equipment of the enamels themselves, which are used in amounts, per unit product, that are considerably lower with respect to the enamels in aqueous solutions intended for lines comprising exclusively analog decorating machines.

At the same time, however, the decoration line according to the present invention makes it possible to obtain, on the surface of the products, base or covering layers that have a thickness that is appropriate and suitable, therefore, for creating the desired visual effects that could be obtained, to this day, only with analog machines that use vitreous enamels in aqueous suspension.

It should be moreover observed that the use of machines that apply the enamels through piezoelectric-driven nozzles makes it possible to obtain results that cannot be obtained with known types of decoration lines in terms of resolution, and therefore in terms of visible quality of the product obtained.

Moreover, such a quality is ensured by the presence of a control and diagnostics station of the products that is equipped with a viewing device, which makes it possible to automatically eliminate the products that are too different from the expected result.

The present invention has been described according to preferred embodiments, but equivalent variants can be conceived without for this reason departing from the scope of protection offered by the following claims.

The invention claimed is:

1. A decoration line, comprising:
a conveyor of products on which to apply enamel;
at least one first machine for applying at least a first layer of enamel onto the products transiting on said conveyer;
at least one second machine arranged downstream of said at least one first machine for applying at least a second layer of enamel onto the products transiting on said conveyer;
wherein each of said at least one first and second machines comprises a respective local control station for managing the basic operation parameters of said at least one first and second machines;
at least one control and diagnostic station defining a first diagnostic level of the operation of said decoration line and communicating online and in feedback with each of said respective local control stations, said at least one control and diagnostic station being equipped with at least a viewing device, said viewing device being arranged downstream of said at least one second machine, for checking a difference between a result obtained on the products and a pre-set graphical reference, and further comprising
at least one microprocessor control supervisor defining a second and upper-level of supervision of checking of the operation of said decoration line, wherein the at least one microprocessor control supervisor is operatively connected to and communicating online with at least each of said local control stations of said first machine and of said second machine and said at least one control and diagnostic station, wherein said at least one microprocessor control supervisor, before implementing a new set-up for a new production lot, generates and sends information relative to the new set-up to said local control stations to enable production of test applications of at least one of said first layer and second layer of enamel without interrupting a current production.

2. The decoration line according to claim 1, wherein said first machine comprises a jet actuated by nozzles having piezoelectric control for applying onto the products transiting on said conveyor at least a first layer of enamel of a glass type in suspension in liquid suspension agent for being processed in a digital decorative system, having a substantially continuous field to create a base or a coating on the products.

3. The decoration line according to claim 1, wherein said second machine comprises a jet actuated by nozzles having piezoelectric control for applying onto the products transiting on said conveyor at least a second layer of enamel of a glass or pigmented type in suspension in liquid suspension agent for being processed in a digital decorative system, having a substantially discontinuous field to create decorative or finishing effects on the products.

4. The decoration line according to claim 1, wherein said control and diagnostic station comprises a microprocessor control device communicating online and in feedback with said local control stations, to eliminate production defects by carrying out cleaning cycles of nozzles or to vary printing parameters in order to recalibrate chromatic shifts.

5. The decoration line according to claim 1, wherein said microprocessor control supervisor communicates online and in feedback with said local control stations.

6. The decoration line according to claim 1, comprising a plurality of said first machines arranged in at least one of series or in parallel, and a plurality of said second machines arranged in at least one of series or in parallel.

7. The decoration line according to claim 6, wherein said plurality of said first machines and said plurality of said second machines are connected by branches of said conveyor.

* * * * *